United States Patent
Newlin

(10) Patent No.: US 9,515,510 B2
(45) Date of Patent: Dec. 6, 2016

(54) APPARATUSES AND METHODS FOR OVER-TEMPERATURE PROTECTION OF ENERGY STORAGE DEVICES

(71) Applicant: Integrated Device Technology, Inc., San Jose, CA (US)

(72) Inventor: Trevor Newlin, Laguna Hills, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 308 days.

(21) Appl. No.: 14/212,947

(22) Filed: Mar. 14, 2014

(65) Prior Publication Data

US 2014/0266015 A1 Sep. 18, 2014

Related U.S. Application Data

(60) Provisional application No. 61/793,893, filed on Mar. 15, 2013.

(51) Int. Cl.
*H02J 7/00* (2006.01)
(52) U.S. Cl.
CPC .................................. *H02J 7/0091* (2013.01)
(58) Field of Classification Search
CPC ....... Y02E 60/12; H02J 7/0042; H02J 7/0045; H02J 7/0091; H02J 7/047; H01M 10/46; H01M 10/44
USPC ........................................................ 320/107
See application file for complete search history.

(56) References Cited

U.S. PATENT DOCUMENTS

| | | | | | |
|---|---|---|---|---|---|
| 5,479,557 | A | * | 12/1995 | Ganz ................... | B60H 1/00428 136/293 |
| 5,767,659 | A | * | 6/1998 | Farley ................... | H01M 10/46 320/106 |
| 2002/0070710 | A1 | * | 6/2002 | Yagi ...................... | H02J 7/0091 320/150 |
| 2004/0145349 | A1 | * | 7/2004 | Mori ...................... | H02J 7/0091 320/128 |
| 2009/0058365 | A1 | * | 3/2009 | Goto ...................... | H01M 10/44 320/134 |
| 2011/0215769 | A1 | * | 9/2011 | Huang ...................... | H02J 7/00 320/145 |
| 2013/0099757 | A1 | * | 4/2013 | Ham ...................... | H02J 7/0047 320/150 |

* cited by examiner

*Primary Examiner* — Arun Williams
(74) *Attorney, Agent, or Firm* — Hayes and Boone LLP

(57) ABSTRACT

A charging system includes a temperature sensor to generate a temperature signal responsive to a temperature of an energy storage device. A circuit temperature sensor generates a circuit temperature signal responsive to a temperature of a semiconductor device. A charge adjuster generates a desired current signal responsive to the temperature signal and the circuit temperature signal. A comparator compares a charge-current level signal to the desired current signal to generate a charge adjustment signal. A charge controller on the semiconductor device generates and adjusts a current of a charging signal for charging the energy storage device responsive to the charge adjustment signal. The charge adjuster may generate a reduction signal when the temperature signal is above a throttle threshold, reduce a digital desired current signal responsive to the reduction signal, and convert the digital desired current signal to the desired current signal as an analog signal.

21 Claims, 3 Drawing Sheets

APPARATUSES AND METHODS FOR OVER-TEMPERATURE PROTECTION OF ENERGY STORAGE DEVICES

CROSS-REFERENCE TO RELATED APPLICATION

This application claims the benefit of U.S. Provisional Application Ser. No. 61/793,893, filed Mar. 15, 2013, the disclosure of which is hereby incorporated herein in its entirety by this reference.

FIELD

Embodiments of the present disclosure relate generally to power charging control using pulse-width modulation and, more particularly, to apparatuses and methods for over-temperature protection during charging of energy storage devices.

BACKGROUND

Charging systems for Energy Storage Devices (ESDs) often use voltage regulators, such as switching voltage regulators, pulse-width-modulation control, and linear regulators. Some charging systems can be configured to charge the ESDs (e.g., electrochemical batteries and supercapacitors) very rapidly. However, in performing this rapid charging, the ESDs, and the devices supplying the charging current can become very hot.

Even with small supercapacitors, charging systems can develop currents as. high as eight Amps and 4-5 Watts of heat may be dissipated in small supercapacitors. Excessive heat can damage the supercapacitors and cause reliability problems with the charging semiconductor device. To handle this excess heat, conventional thermal shutdown proposals would turn the charging device off until the device cooled down and then would retry the charging process. This start and stop charging process can add considerable time to the overall charging process and, in order to prevent nuisance tripping, would require the temperature at which charging stops to be set high, which could increase the risk of damage to the charging device, damage to the ESD, or even fires.

There is a need for a more efficient means for providing over-temperature protection of charging system, while still providing an efficient charging process for energy storage devices.

BRIEF SUMMARY

Embodiments of the present disclosure provide new over-temperature protections for semiconductor devices and energy storage devices that produce a charging environment that gradually throttles charging current and adapts to over-temperature conditions.

Embodiments of the present disclosure include a charging controller that includes a temperature sensor thermally coupled with an energy storage device and configured for generating a temperature signal responsive to a temperature of the energy storage device. A circuit temperature sensor on a semiconductor device is configured for generating a circuit temperature signal responsive to a temperature of the semiconductor device. A charge adjuster is operably coupled to the temperature sensor and the circuit temperature sensor and is configured for generating a desired current signal responsive to both the temperature signal and the circuit temperature signal. A comparator is configured for comparing a current level signal, which indicates a level of charge current to the energy storage device, to the desired current signal to generate a charge adjustment signal. A charge controller on the semiconductor device is configured for generating and adjusting a current of a charging signal for charging the energy storage device responsive to the charge adjustment signal.

Embodiments of the present disclosure include a charging controller that includes a temperature sensor thermally coupled with an energy storage device. The temperature sensor generates a temperature signal responsive to a temperature of the energy storage device. A temperature monitor generates a reduction signal when the temperature signal is above a throttle threshold. A down counter reduces a digital desired current signal responsive to the reduction signal. A digital-to-analog converter converts the digital desired current signal to a desired current signal. A comparator compares a current level signal, indicating level of charge current to the energy storage device, to the desired current signal to generate a pulse-width adjustment signal. A pulse-width-modulation controller generates and adjusts a pulse-width of a charging signal for charging the energy storage device responsive to the pulse-width adjustment signal.

Embodiments of the present disclosure include a method of charging an energy storage device. The method includes sensing a temperature of the energy storage device to generate a temperature signal with a temperature sensor thermally coupled with the energy storage device. A reduction signal is asserted when the temperature signal is above a throttle threshold and a digital desired current signal is decremented responsive to the reduction signal. The digital desired current signal is converted to a desired current signal as an analog signal. A current level signal, indicating level of charge current to the energy storage device, is compared to the desired current signal to generate a charge adjustment signal and a charging signal is generated to charge the energy storage device with a current responsive to the charge adjustment signal.

DETAILED DESCRIPTION

Figure 1:
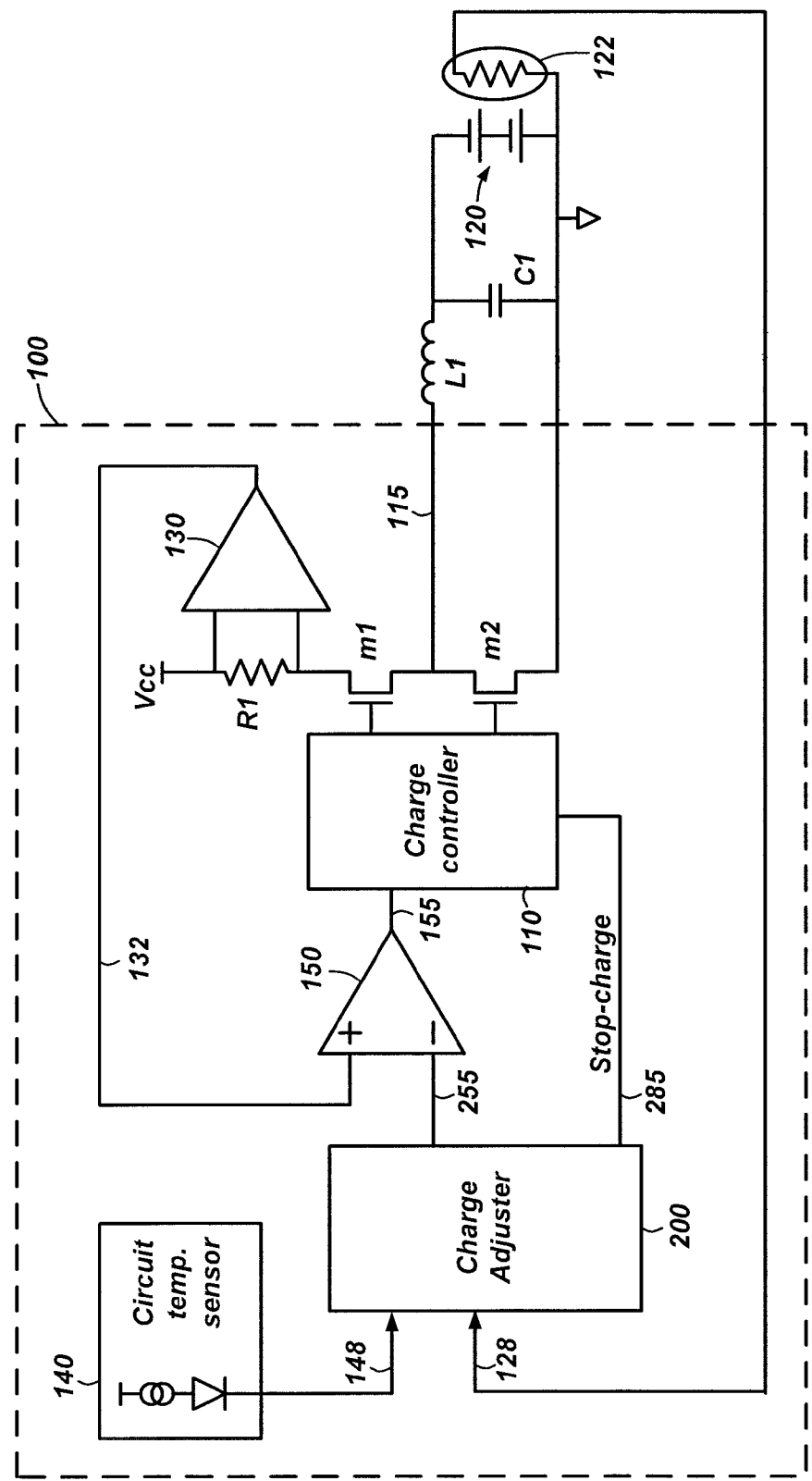
FIG. 1 is a schematic block diagram of a charging system according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 3 will be mostly in the numerical format 3xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Embodiments of the present disclosure provide new overtemperature protections for semiconductor devices and Energy Storage Devices (ESDs) that produce a charging environment that gradually throttles charging current and adapts to over-temperature conditions.

Examples of energy storage devices to which the charging may be applied include capacitors (e.g., supercapacitors, ultracapacitors, electrolytic capacitors, etc.), batteries (e.g., Li-ion, NiMH, etc.), and other similar devices configured to receive a power signal generated by a charging system, store energy from the charging system, and supply the stored energy to an electrical load.

A supercapacitor may be an electrochemical capacitor that includes double-layer electrodes that have a capacitance value determined by a double-layer capacitance and pseudo-capacitance. Supercapacitors may also be referred to herein as ultracapacitors. Supercapacitors may include double-layer capacitors, pseudo-capacitors, and hybrid capacitors. Double-layer capacitors include electrochemical capacitors in which the static double-layer capacitance is much higher than the faradaic pseudo-capacitance. Pseudo-capacitors include electrochemical capacitors in which the faradaic pseudo-capacitance is much higher than the static double-layer capacitance. Hybrid capacitors include capacitors with electrodes that exhibit significant double-layer capacitance and pseudo-capacitance.

Embodiments of the present disclosure substantially maximize charging current to an ESD and hence produce a fast charging time for applications where thermal conditions are less than ideal. With fast charging, for example of supercapacitors, the supercapacitors, and the charging device can run very hot. With currents as high as eight amps, the charging system can see 4-5 Watts of heat dissipated in the small supercapacitors. Excessive heat can damage the supercapacitors and cause reliability problems with semiconductor devices that include the charging system. Conventional thermal shutdown would turn the part off until the part cooled down and then would retry. This on and off scenario can add considerable time to the charging process and to prevent nuisance tripping would require the off threshold to be set high increasing the chance of fire and the risk of damage to the ESD, the charging system, or both.

FIG. 1 is a schematic block diagram of a charging system according to an embodiment of the present disclosure. The charging system includes an ESD 120, a temperature sensor 122, and a charging system 100. The charging system 100 includes a charge controller 110 configured to generate and adjust a current of a charging signal 115 for charging the energy storage device 120 responsive to the charge adjustment signal 155. The charge controller 110 may be configured to generate the charging signal 115 for a variety of charging systems, such as, for example, a linear regulator, a boost converter, a flyback converter or any other current regulating system. For ease of description, most of the description herein focuses on a pulse-width-modulation controller 110 as the charge controller 110. Based on the description herein, those of ordinary skill in the art would be able to adapt the charge controller 110 to differently configured charge controllers 110 that adjust the charging signal 115 based on the charge adjustment signal 155, but use other current regulating systems.

When the charge controller 110 includes a pulse-width-modulation controller 110, the pulse-width-modulation controller 110 may be configured to generate switching signals to control relatively high current transistors, such as, for example, the FET transistors shown in FIG. 1 as a high-side transistor m1 and a low-side transistor m2. The output of the two transistors (m1 and m2) generates a charging signal 115 (may also be referred to herein as a pulse-width modulated signal 115). As a non-limiting example, the embodiment in FIG. 1 illustrates a filter including an inductor L1 and a capacitor C1. This filter modifies the charging signal 115 to create a current that is substantially a DC signal for charging the ESD 120.

In other charge controllers 110, there may not be a need for the two transistors (m1 and m2) or the filter including the inductor L1 and the capacitor C1. In such systems, the charge controller 110 may directly generate the charging signal 115.

The pulse-width-modulation controller 110 may be configured to drive the gates of the high-side transistor m1 and the low-side transistor m2 at a relatively high frequency to perform the desired voltage regulation operation according to the configuration of a switching voltage regulator (which is a buck converter topology in FIG. 1). Those of ordinary skill in the art will understand that while referred to as "pulse-width" modulation, the modulation may also include duty-cycle modulation in addition to, or instead of, pulse-width modulation.

When configured in a feedback loop, the pulse-width-modulation controller 110 controls the amount of charging current delivered to the ESD 120 through the high-side transistor m1, the low-side transistor m2, and the filter including the inductor L1 and the capacitor C1. This delivered charging current is controlled based on a pulse-width adjustment signal 155 input to the pulse-width-modulation controller 110. The pulse-width adjustment signal 155 may also be referred to more generically as the charge adjustment signal 155 to include other types of current regulation systems as discussed above.

ESDs 120, such as ultracapacitors and rechargeable batteries for electronic equipment may be equipped with thermistors 122 or other types of temperature sensors 122 to measure the temperature of the ESD 120.

For ultracapacitors, the temperature sensor 122 may be used to prevent overheating of the ultracapacitor during fast charge. In conventional chargers, during fast charge considerable heat is produced, overheating can produce permanent capacity loss and damage to the ultracapacitor. To allow for this fast charging, the fast charge current needs to be considerably de-rated to allow for the worst-case ambient temperature. Embodiments of the present disclosure use the temperature sensor 122 in a thermal throttling process that can be used to allow faster charging by gradually backing off the current when temperature of the ESD 120 rises to the point that damage may occur.

A temperature signal 128 from the temperature sensor 122 is fed to a charge adjuster 200, which determines if adjustments to the current level on the charging signal 115 should be made based on the temperature signal 128. The charge adjuster 200 generates a desired current signal 255 to indicate the desired current level for the charging signal 115.

As a non-limiting example, a source current for the charging signal 115 may be determined by a differential amplifier 130 measuring a voltage drop across a resistor R1. Thus, a current level signal 132 output from the differential amplifier 130 indicates the present amount of current that is being delivered to the ESD 120 via the charging signal 115.

A comparator 150 compares the desired current signal 255 from the charge adjuster 200 to the current level signal 132 to generate the pulse-width adjustment signal 155, which will control the pulse-width-modulation controller 110 to adjust the current in the charging signal 115 up or down based on the pulse-width adjustment signal 155.

In operation, when the temperature signal 128 goes above a throttle threshold, the charge adjuster 200 will slightly lower the voltage of the desired current signal 255. This lower voltage for the desired current signal 255 will cause the comparator 150 and the pulse-width-modulation controller 110 to lower the current to the ESD 120. As the current to the ESD 120 goes lower, the voltage level of the current level signal 132 from the differential amplifier 130 will go lower until the feedback loop is in balance at the lower level indicated by the desired current signal 255.

In another feedback loop, if the temperature signal 128 remains above the throttle threshold, the charge adjuster 200 will again slightly lower the voltage of the desired current signal 255, which will further lower the current to the ESD 120. This process will continue until the temperature of the ESD 120 indicated by the temperature signal 128 from the temperature sensor 122 goes below the throttle threshold. Further details of a specific embodiment for the charge adjuster 200 and the throttle threshold are discussed below with reference to FIG. 2.

In some embodiments, some or all of the elements of the charging system 100 may be included in a semiconductor device. In such configurations, when the charging system 100 is providing high currents to the ESD 120, the semiconductor device may become too hot. Thus, in some embodiments, a circuit temperature sensor 140 may be included. As a non-limiting example, in FIG. 1 the circuit temperature sensor 140 is shown as a forward biased diode. The forward voltage of a diode, or diode-connected transistor, exhibits a negative temperature coefficient relative to the voltage when a constant current is flowing through the diode. For example, the negative temperature coefficient can be about two mV/° C. Thus, if the diode (or other type of circuit temperature sensor 140) is placed in a region of the semiconductor device that is known to get hot, the circuit temperature sensor 140 may be used in a feedback loop that can also reduce the temperature of the semiconductor device.

In embodiments with a circuit temperature sensor 140, a feedback loop similar to that for the temperature sensor 122 for the ESD 120 may be employed. If a circuit temperature signal 148 remains above a circuit throttle threshold, the charge adjuster 200 will slightly lower the voltage of the desired current signal 255, which will further lower to the current to the ESD 120. This process will continue until the temperature of the semiconductor device, indicated by the circuit temperature signal 148 from the circuit temperature sensor 140 goes below the circuit throttle threshold. Further details of a specific embodiment for the charge adjuster 200 and circuit throttle threshold are discussed below with reference to FIG. 2.

In some embodiments, the charge adjuster 200 may drive a stop-charge signal 285 to the pulse-width-modulation controller 110 to stop charging of the ESD 120 if the temperature of the ESD 120 goes above a maximum temperature, as discussed below with reference to FIGS. 2 and 3.

Those of ordinary skill in the art will recognize that different embodiments of the charging system 100 may include different elements on the semiconductor device 100. FIG. 1 illustrates an example where all the elements except the inductor L1 and capacitor C1 are on the semiconductor device. In other embodiments, the high-side transistor m1 and the low-side transistor m2 may also be external to the semiconductor device. Other configurations are also contemplated within the scope of the present disclosure.

The charging system 100 may also be included as part of an electronic device that includes other functions. For example, the electronic device may include other components, such as an input device, an output device, a processor, memory, etc. for operation thereof. Exemplary electronic devices include mobile devices, such as smart phones, cell phones, tablet computers, laptop computers, electronic readers, cameras, and other similar devices that are powered by energy storage devices 120 that may require charging. Of course, electronic devices may also include non-mobile devices that are powered by energy storage devices 120, such as personal computers, or other devices that may employ energy storage devices 120 for primary or back up power. For example, on-board (e.g., motherboard) back-up power supplies may need to be charged quickly to be fully charged before work is performed, such that employing embodiments of the present disclosure may be useful.

Figure 2:
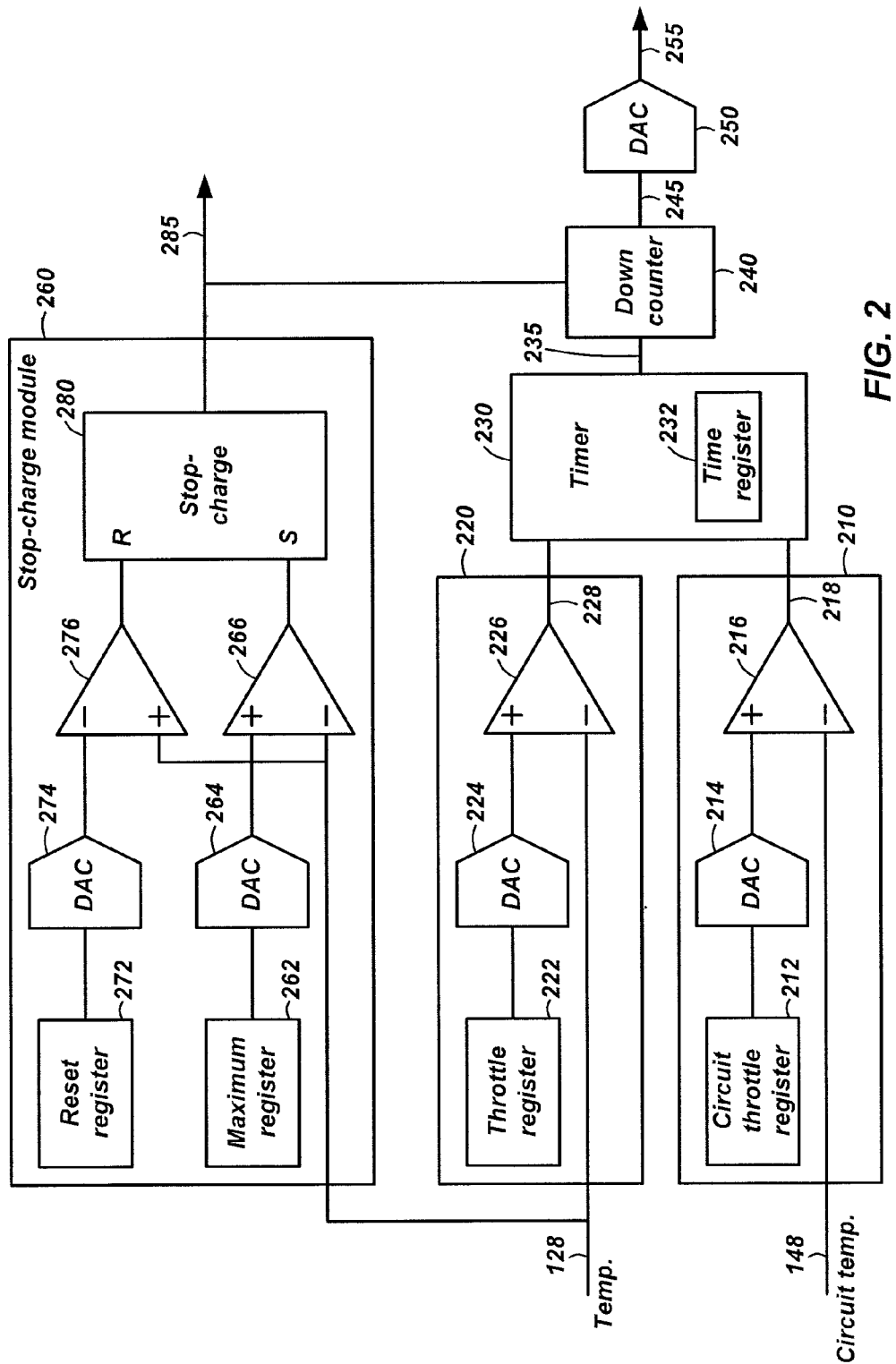
FIG. 2 is a schematic block diagram of details of a charge adjuster according to an embodiment of the present disclosure.

FIG. 2 is a schematic block diagram of details of the charge adjuster 200 according to an embodiment of the present disclosure. A temperature monitor 220 may be included to monitor the temperature signal 128 from the temperature sensor 122 thermally coupled to the ESD 120. A circuit temperature monitor 210 may be included to monitor the circuit temperature signal 148 from the circuit temperature sensor 140 on the semiconductor device. A stop-charge module 260 may be included to determine when to stop all charging if the ESD 120 reaches a dangerously high temperature and when to subsequently re-enable charging when the ESD 120 returns to an acceptably low temperature to begin charging again.

As a non-limiting example of the temperature monitor 220, FIG. 2 illustrates a throttle register 222 that can be programmed to a digital value representing a voltage at which the temperature signal 128 would indicate a temperature of the ESD 120 where throttling of the charging current should begin as discussed above with respect to FIG. 1. The value from the throttle register 222 may be converted to an analog voltage by a first Digital-to-Analog Converter (DAC) 224, which is then compared to the voltage on the temperature signal 128 by a first comparator 226, to generate a reduction signal 228.

Similarly, for the semiconductor device temperature, the circuit temperature monitor 210 may include a circuit throttle register 212 that can be programmed to a digital value representing a voltage at which the circuit temperature signal 148 would indicate a temperature of the semiconductor device where throttling of the charging current should begin as discussed above with respect to FIG. 1. The value from the circuit throttle register 212 may be converted to an analog voltage by a second DAC 214, which is then compared to the voltage on the circuit temperature signal 148 by a second comparator 216, to generate a circuit reduction signal 218.

In some embodiments, the circuit reduction signal 218 and the reduction signal 228 may feed a timer 230. There may be a long thermal time constant in the feedback loop from when a charging current is reduced to the ESD 120 and when a lower temperature may be sensed at the temperature sensor 122. In such embodiments, a programmable delay counter may be included in the timer 230 to add a delay between when the circuit reduction signal 218, the reduction signal 228, or both are asserted and when further reductions in charging current are made. After the time delay, a decrement signal 235 is asserted to a down counter 240. The predefined time delay may be set by a programmable time register 232.

Some embodiments may not include the timer 230. In such embodiments, when the circuit reduction signal 218, the reduction signal 228, or both are asserted the decrement signal 235 to the down counter 240 may be directly asserted.

The down counter 240 may be set to a predetermined starting count value when charging begins to set a maximum desired charging current. Thereafter, each time the decrement signal 235 is asserted, the down counter 240 reduces by one least significant bit. The output of the down counter 240 may be considered a digital desired current signal 245, which drives a desired current DAC 250 to generate the desired current signal 255, which is fed to the comparator 150 in FIG. 1 to complete the feedback loop. Thus, if at the end of the timer delay the temperature of the ESD 120 or the temperature of the semiconductor device 100 is still above the desired level, the digital desired current signal 245 is decremented and the timer 230 is reset. For each subsequent timer delay, the digital desired current signal 245 will decrement and the voltage level of the desired current signal 255 will proportionally reduce. If the temperature keeps rising and reaches the maximum temperature, the charger may be shut off until the temperature falls allowing charging to resume.

The stop-charge module 260 controls this shut off process when the maximum temperature is reached. The stop-charge module 260 may include a maximum register 262 that can be programmed to a digital value representing a voltage at which the temperature signal 128 would indicate a temperature of the ESD 120 where charging should be halted because the temperature is reaching a level where damage may occur. The value from the maximum register 262 may be converted to an analog voltage by a third DAC 264, which is then compared to the voltage on the temperature signal 128 by a third comparator 266, to generate a set signal. The set signal may set a set-reset flip-flop 280 to assert the stop-charge signal 285.

Once set, the stop-charge signal 285 remains set until the temperature of the ESD 120 returns to a reset temperature level. A reset register 272 can be programmed to a digital value representing a voltage at which the temperature signal 128 would indicate a temperature of the ESD 120 where it is safe to resume charging. The value from the reset register 272 may be converted to an analog voltage by a fourth DAC 274, which is then compared to the voltage on the temperature signal 128 by a fourth comparator 276, to generate a reset signal when the temperature signal 128 is below the output of the fourth DAC 274. The reset signal may reset the set-reset flip-flop 280 to negate the stop-charge signal 285 and allow charging to resume. In some embodiments, the stop-charge signal 285 may also reset the down counter 240 to its maximum value so full charging can begin and the throttling process resumes.

While not specifically illustrated, a person of ordinary skill in the art will recognize that another stop-charge module 260 may be included to monitor a maximum temperature of the semiconductor device in a manner similar to that described for the temperature of the ESD 120.

Figure 3:
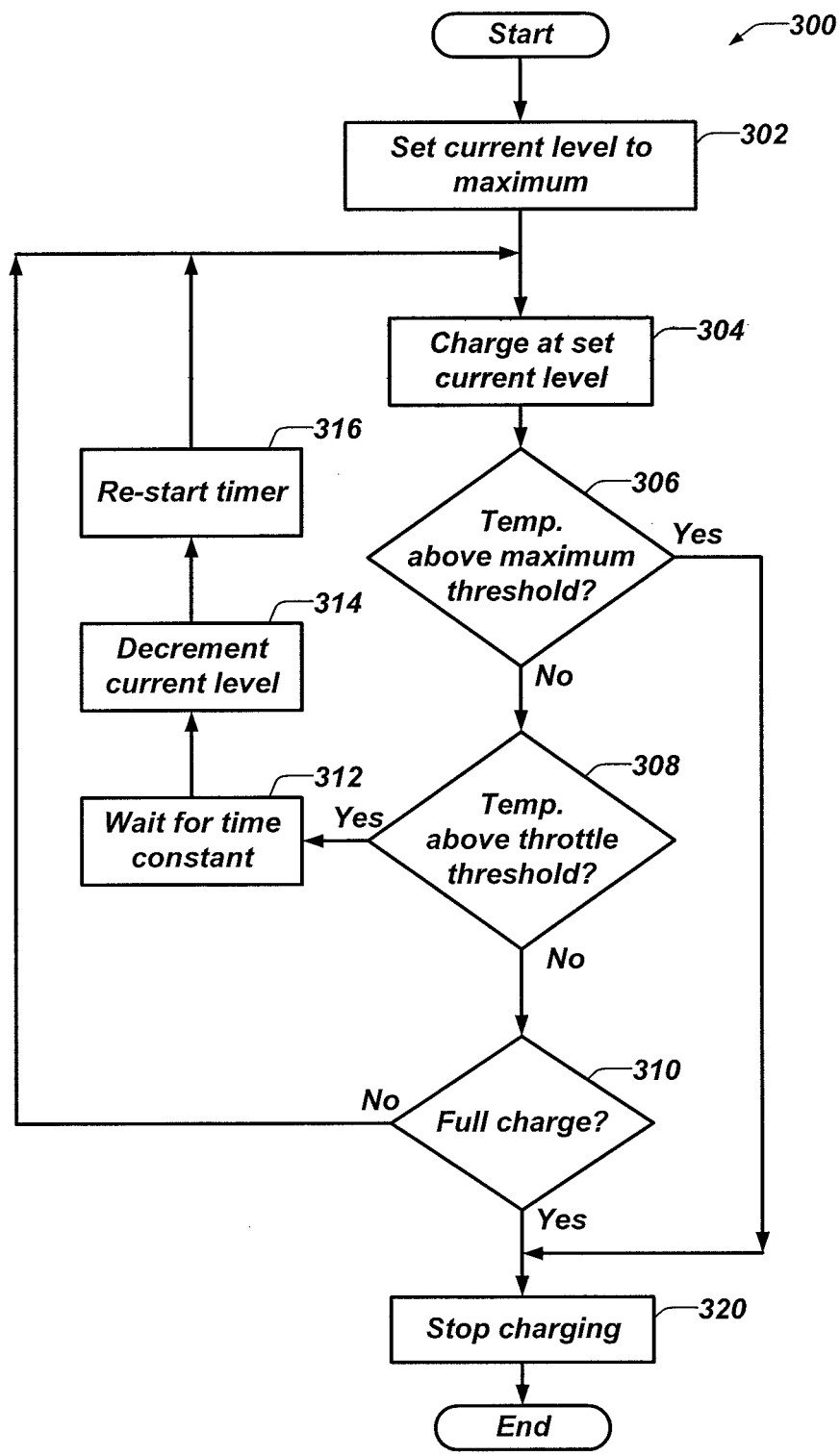
FIG. 3 is a flowchart illustrating a method of charging an energy storage device according to an embodiment of the present disclosure.

FIG. 3 is a flowchart illustrating a method 300 of charging an energy storage device 120 according to an embodiment of the present disclosure. Reference will also be made to FIGS. 1 and 2 when describing the process 300 of FIG. 3. Operation 302 indicates that the process 300 begins by setting the charging current level to its maximum possible. In the embodiment of FIGS. 1 and 2, this maximum setting may be accomplished by setting the down counter 240 to its maximum value and ensuring that the stop-charge signal 285 is negated.

Operation 304 indicates that charging commences and/or continues at the current level set by the down counter 240. Operation 306 indicates that a test is made to see if the maximum temperature of the ESD 120 and/or the semiconductor device has been reached. If so, the process 300 jumps to operation 320 where charging is stopped and the process exits. Once charging has stopped, the process may begin again after the reset temperature has been reached as discussed above.

Returning to operation 306, if the maximum temperature has not been reached, operation 308 checks to see if the throttling temperature of the ESD 120 and/or the semiconductor device has been reached. If so, operation bloc 312 indicates that the process 300 waits until the time constant from any previous current reductions has expired as discussed above with reference to FIG. 2. After the time constant has expired, operation 314 indicates that the down counter 240 is decremented to set a new, lower level for the desired current signal 255 and operation 316 indicates that the timer 230 is re-started to begin a new time constant until the next decrement can take place. The throttling loop then begins again at operation 304 with the charge current set at the new lower level. This throttling loop continues until operation 308 indicates that the temperatures of the ESD 120 and/or the semiconductor device are below their respective throttle thresholds.

Returning to operation 306, if the temperatures of the ESD 120 and/or the semiconductor device are below their respective throttle thresholds, operation 310 tests to see if the ESD 120 is fully charged. If not, the process continues back at the currently set charge level at operation 304. If the ESD 120 is fully charged, operation 320 indicates that charging is stopped and the process 300 exits.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A charging system, comprising:
   a temperature sensor thermally coupled with an energy storage device and configured for generating a temperature signal responsive to a temperature of the energy storage device;
   a circuit temperature sensor on a semiconductor device configured for generating a circuit temperature signal responsive to a temperature of the semiconductor device;
   a charge adjuster operably coupled to the temperature sensor and the circuit temperature sensor, the charge adjuster configured to:
      determine when the temperature signal or the circuit temperature signal indicates an over-temperature condition;
      decrement a down counter based on the determination; and
      generate a desired current signal based on a value of the down counter;
   a comparator configured for comparing a current level signal to the desired current signal to generate a charge adjustment signal, the current level signal indicating a level of charge current being supplied to the energy storage device; and
   a charge controller on the semiconductor device and configured for generating and adjusting a current of a charging signal for charging the energy storage device responsive to the charge adjustment signal.

2. The charging system of claim 1, wherein the charge controller comprises a pulse-width modulation controller on the semiconductor device and is configured for generating and adjusting a pulse-width of a charging signal for charging the energy storage device responsive to the charge adjustment signal.

3. The charging system of claim 1, further comprising a timer configured for providing a predefined time delay between when the temperature signal exceeds a throttle threshold and the decrementing of the down counter.

4. The charging system of claim 3, wherein the timer is further configured for providing the predefined time delay between when the circuit temperature signal exceeds a circuit throttle threshold and the decrementing of the down counter.

5. The charging system of claim 1, wherein the charge adjuster further comprises:
   a temperature monitor configured for generating a reduction signal when the temperature signal is above a throttle threshold;
   a circuit temperature monitor configured for generating a circuit reduction signal when the circuit temperature signal is above a circuit throttle threshold; and
   a digital-to-analog converter configured for converting the value of the down counter to the desired current signal;
   wherein the charge adjuster is further configured to decrement the down counter in response to the reduction signal, the circuit reduction signal, or a combination thereof.

6. The charging system of claim 5, further comprising a timer configured for providing a predefined time delay between generation of the reduction signal and the decrementing of the down counter.

7. The charging system of claim 5, further comprising a stop-charge module configured for:
   disabling the charge controller from generating the charging signal when the temperature signal is above a maximum temperature; and
   enabling the charge controller to generate the charging signal when the temperature signal is below a reset temperature.

8. The charging system of claim 7, wherein the stop-charge module is further configured for resetting the down counter to a predetermined starting count value as part of the enabling.

9. The charging system of claim 1, further comprising a differential amplifier configured for:
   measuring the level of charge current delivered to the energy storage device; and
   outputting the current level signal to the comparator.

10. A charging system, comprising:
    a temperature sensor thermally coupled with an energy storage device and for generating a temperature signal responsive to a temperature of the energy storage device;
    a charge adjuster coupled to the temperature sensor, the charge adjuster configured to:

determine using a temperature monitor when the temperature signal is above a throttle threshold;
generate a reduction signal when the temperature signal is above a throttle threshold;
decrement a down counter when the reduction signal is detected; and
convert, using a digital-to-analog converter, a value of the down counter to a desired current signal;
a comparator for comparing a current level signal to the desired current signal to generate a pulse-width adjustment signal, the current level signal indicating a level of charge current supplied to the energy storage device; and
a pulse-width-modulation controller for generating and adjusting a pulse-width of a charging signal for charging the energy storage device responsive to the pulse-width adjustment signal.

11. The charging system of claim 10, further comprising a timer for providing a predefined time delay between determining when the temperature signal is above the throttle threshold and decrementing of the down counter.

12. The charging system of claim 10, further comprising:
a circuit temperature sensor on a semiconductor device including the pulse-width-modulation controller, the circuit temperature sensor for generating a circuit temperature signal responsive to a temperature of the semiconductor device; and
wherein the charge adjuster is further configured to:
determine using a circuit temperature monitor when the circuit temperature signal is above a circuit throttle threshold;
generate a circuit reduction signal when the circuit temperature signal is above a circuit throttle threshold; and
decrement the down counter when the circuit reduction signal is detected.

13. The charging system of claim 12, further comprising a timer for providing a predefined time delay between determining when the circuit temperature signal is above the circuit throttle threshold and the decrementing of the down counter.

14. The charging system of claim 10, further comprising a stop-charge module for:
disabling the pulse-width-modulation controller from generating the charging signal when the temperature signal is above a maximum temperature; and
re-enabling the pulse-width-modulation controller to generate the charging signal when the temperature signal is below a reset temperature.

15. The charging system of claim 14, wherein the stop-charge module is further configured for resetting the down counter to a predetermined starting count value as part of the enabling.

16. A method of charging an energy storage device, comprising:
sensing a temperature of the energy storage device to generate a temperature signal with a temperature sensor thermally coupled with the energy storage device;
asserting, by a temperature monitor included in a charge adjuster, a reduction signal when the temperature signal is above a throttle threshold;
decrementing, by the charge adjuster, a down counter responsive to the reduction signal;
generating, by the charge adjuster, a desired current signal based on a value of the down counter;
comparing a current level signal to the desired current signal to generate a charge adjustment signal, the current level signal indicating a level of charge current supplied to the energy storage device; and
generating a charging signal to charge the energy storage device with a current responsive to the charge adjustment signal.

17. The method of claim 16, further comprising providing a predefined time delay between an assertion of the reduction signal and the decrementing of the down counter.

18. The method of claim 16, further comprising:
sensing a circuit temperature of a semiconductor device including a pulse-width-modulation controller;
asserting a circuit reduction signal when the circuit temperature is above a circuit throttle threshold;
decrementing the down counter responsive to the circuit reduction signal; and
generating the charging signal is performed by the pulse-width-modulation controller.

19. The method of claim 18, further comprising providing a predefined time delay between an assertion of the circuit reduction signal and the decrementing of the down counter.

20. The method of claim 16, further comprising:
disabling the generating of the charging signal with variable pulse widths when the temperature signal is above a maximum temperature; and
re-enabling the generating of the charging signal with variable pulse widths when the temperature signal is below a reset temperature.

21. The method of claim 20, further comprising resetting the down counter to a predetermined starting count value as part of the enabling.

* * * * *